April 2, 1957     R. W. K. SCHÜMANN     2,787,258
INTERNAL COMBUSTION ENGINE
Filed Nov. 12, 1952     2 Sheets-Sheet 1

Inventor
Richard W. K. Schaumann
By: Dike and Padlon
ATTORNEYS

April 2, 1957 — R. W. K. SCHÜMANN — 2,787,258
INTERNAL COMBUSTION ENGINE
Filed Nov. 12, 1952 — 2 Sheets-Sheet 2
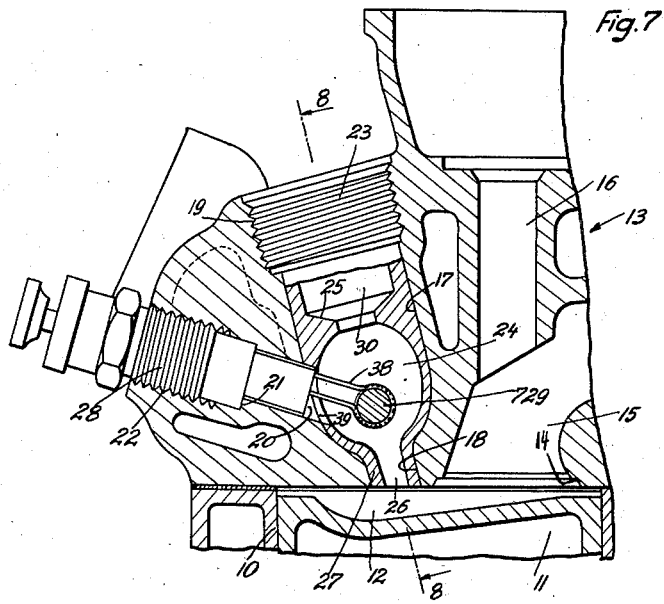
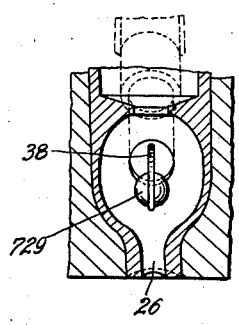
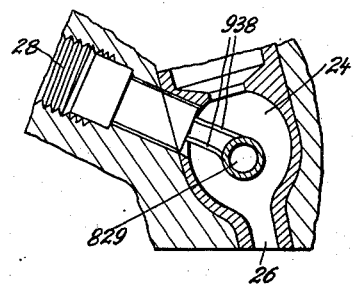
Inventor
Richard W. K. Schumann
By: Dieke and Padlon
ATTORNEYS

United States Patent Office 2,787,258
Patented Apr. 2, 1957

2,787,258

INTERNAL COMBUSTION ENGINE

Richard W. K. Schümann, Stuttgart-Unterturkheim, Germany, assignor to Daimler-Benz Aktiengesellschaft, Stuttgart-Unterturkheim, Germany Application November 12, 1952, Serial No. 319,954

Claims priority, application Germany November 12, 1951

14 Claims. (Cl. 123—32)

My invention relates to an internal combustion engine of the type having a pre-combustion chamber communicating with the cylinder and provided with means for injecting fuel into said chamber, the fuel being ignited owing to the high temperature produced in said chamber by the compression of the air charge. When machines of that kind are idling, they are liable to produce a knocking sound which is particularly undesirable when the engine is installed in a motor vehicle.

It is the object of the present invention to provide improved means for reducing such knocking sound effects.

More specifically, it is the object of the present invention to provide means located within the internal combustion chamber and adapted to so influence the ignition process as to reduce or eliminate the sound incidental to the combustion of the injected fuel.

I attain this object by the provision within the combustion chamber of a body of a more or less spherical shape so located as to be hit by the injected fuel. This body will so control the initial phase of the ignition as to substantially reduce the knocking sound liable to occur when the engine is idling, particularly when the engine is still in a comparatively cold condition. Also, the provision of such body will facilitate the operation of starting the engine in cold condition. When the fuel impinges upon the comparatively large surface of the body mounted within the pre-combustion chamber, such body having a high temperature, a large proportion of the fuel will rapidly vaporize whereby an immediate ignition without any substantial delay will be attained.

In the pre-combustion diesel engines of orthodox design, an incandescent plug heated by electric means is inserted in the wall of the pre-combustion chamber so as to be hit by the injected fuel. Such plug, however, cannot be given such a large surface as that of the body mounted in the pre-combustion chamber in accordance with my invention and, therefore, cannot produce such a quick and effective vaporization and initial ignition as attained with my invention.

The body which I mount within the pre-combustion chamber spaced from the walls thereof is preferably so shaped as to result in a low resistance to flow and, therefore, may be given a diameter of 10 millimeters or more when applied to an automobile engine of the pre-combustion chamber type without, in any way, adversely affecting the fuel consumption or the power output of the engine.

Further objects of the invention will appear from a detailed description of a number of preferred embodiments thereof, and the features of novelty will be pointed out in the claims. However, I wish it to be clearly understood that such detailed description serves the purpose of illustration of the invention rather than of limitation.

In the drawings:

Fig. 7 is a partial axial section of the cylinder head of an internal combustion engine provided with means for heating the body located within the pre-combustion chamber;

Fig. 8 is the section taken along line 8—8 of Fig. 7 and

Fig. 9 is a view similar to that of Fig. 7 illustrating modified means for heating the spherical body located within the pre-combustion chamber.

Figure 1:
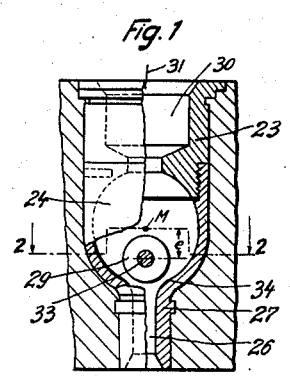
Fig. 1 is an elevation, partly in vertical axial section of a casting forming a pre-combustion chamber and provided with the improved means according to my invention, said casting being inserted in the cylinder head of a diesel engine.

The diesel engine to which my invention is applicable is provided with a cylinder block 10 (Figure 7) forming a water jacket for the cylinder or cylinders therein, with a piston 11 in each cylinder having a dished top constituting a main combustion chamber 12, with a water-jacketed cylinder head designated as a whole by 13. The cylinder head 13 is formed with seats for air-inlet and -outlet valves, one such seat 14 being visible only in Fig. 7, the associated valve being omitted, with ducts for the admission of combustion air to and discharge of the combustion gases from the cylinder, one such duct 15 being shown only, communicating with a bore 16 for the insertion of a guide sleeve for the valve stem, with an inclined bore 17 having a restricted lower end 18 terminating in the bottom face of the cylinder head 13 and having a threaded enlarged upper end 19 and, finally, with a bore 20 inclined to bore 17 and intersecting the same being formed with a shoulder 21 and with threads 22 in its upper section.

The bore 17 serves the purpose of accommodating a hollow member, for example, a casting 23, tapered at its lower end 27 and formed with an internal pre-combustion chamber 24, communicating with a seat 25 and with a channel 26 being co-axially disposed with respect to the casting 23. The channel 26 extends through the lower end 27 of the casting and terminates in the main combustion chamber 12. The seat 25 accommodates the fuel injection mechanism 30 of well known design provided with a fuel injecting valve adapted to intermittently issue a spray of fuel axially into the chamber 24 in which the fuel mixes with the compressed highly heated air charge and is ignited therein. By the increased pressure so produced, the burning air-fuel-mixture is injected through channel 26 into the main combustion space 12 for complete combustion within the cylinder 10.

When the machine is cold, the compression of the air charge itself may be insufficient to raise the temperature existing in the chamber 24 to the ignition point. Therefore, in order to be able to start the engine in cold condition, the cylinder head is equipped with a starting plug 28 (Figure 7) inserted in bore 20 and provided with a shoulder seated on shoulder 21, and with a threaded section engaging the threads 22. The starting plug is provided with an incandescent wire which may be heated by an electrical current to thereby raise the temperature prevailing in the pre-combustion chamber 24.

In pre-combustion diesel engines of that type which on a large scale are being used to operate motor vehicles, a disagreeable knocking sound is produced when the engine is idling, particularly before the engine has reached its normal operating temperature. It is believed that this sound is due to a delay of the initial ignition, the delayed ignition being particularly vehement causing compression waves impinging upon the walls of the pre-combustion chamber with considerable impact producing the undesirable sound effects. It is the object of my invention to provide means which will counteract or preclude such effects without adversely affecting the power output and the fuel consumption of the engine.

For that purpose I mount a body within the pre-combustion chamber 24 in spaced relationship to the walls thereof and so located relative to the fuel injection mechanism 30 as to be hit by the injected fuel. In the embodiment shown in Figs. 1 and 2, such body is formed by the spherical portion 29 of a pin which is attached to the member 23 so as to extend into the chamber 24. The pre-combustion chamber constitutes a more or less spherical space, having the center M (Fig. 1), and the channel 26 flares outwardly at its top as shown at 34 thereby gradually and smoothly joining the pre-combustion chamber 24 with a rounded profile.

Figure 2:
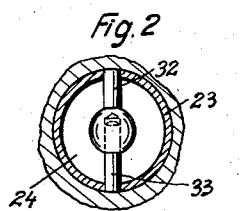
Fig. 2 is a horizontal section taken along the broken line 2—2 of Fig. 1.

The walls of the pre-combustion chamber formed by the member 23 are provided with co-axial bores, the common axis of said bores intersecting the axis 31 of the casting 23. In such bores the ends of the pin provided with the spherical portion 29 are inserted, the pin being composed of a section 32 formed integral with the sphere 29 and of a section 33 formed with threads engaging a threaded axial bore provided in the sphere 29 as indicated in Fig. 2 by dotted lines. Alternatively, in lieu of a threaded engagement, other means may be used to secure pin section 33 in the sphere 29 such as a pressed fit. Preferably, the center of the sphere 29 coincides with the axis 31 of the pre-combustion chamber 24. As a result, the spray of fuel issuing from the fuel injection mechanism 30 will hit the sphere 29. Since in operation the latter is highly heated, at least part of the fuel will immediately vaporize and ignite. Preferably, the sphere 29 is located beneath the center M of the pre-combustion chamber being spaced a few millimeters therefrom. However, if desired, the sphere 29 may be concentrically arranged within the pre-combustion chamber.

Figure 3:
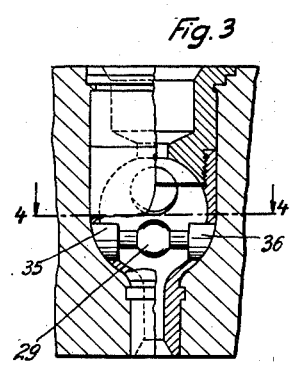
Fig. 3 is a view similar to that of Fig. 1 of another embodiment of my invention.
Figure 4:
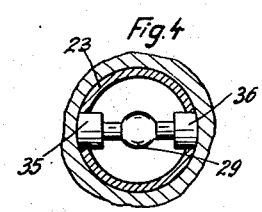
Fig. 4 is a horizontal section similar to that of Fig. 2 of the embodiment shown in Fig. 3, taken along line 4—4 of Fig. 3.

The embodiment illustrated in Figs. 3 and 4 differs from that shown in Figs. 1 and 2 by both pin sections being integral with the spherical body 29 and being equipped with enlarged heads 35 and 36 having a diameter at least equal to that of the sphere 29. The heads 35 and 36 are inserted in co-axial bores provided in the walls of casting 23. Owing to the large diameter of such bores, the pin formed with the spherical body may be inserted into the pre-combustion chamber from the outside through such bores.

Figure 5:
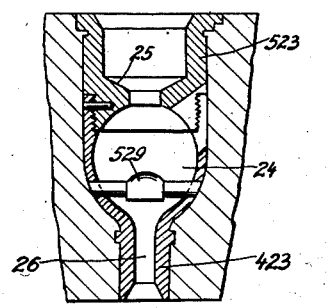
Fig. 5 is a vertical axial section of still another embodiment of the casting forming the pre-combustion chamber and inserted in the head of a diesel engine, said casting being provided with my novel means.

In the embodiments shown in Figs. 1, 3 and 5 the casting is illustrated as being composed of a lower section, such as 423, and upper section, such as 523, the upper section being formed with the seat 25 for the fuel injection mechanism. In the embodiment shown in Fig. 5 the body 529 mounted within the pre-combustion chamber 24 closely beneath the center thereof and spaced from the walls thereof is carried by pin sections similar to those shown in Fig. 2. However, the body 529 is semi-spherical rather than spherical, the flat portion of the semi-sphere facing the channel 26.

Figure 6:
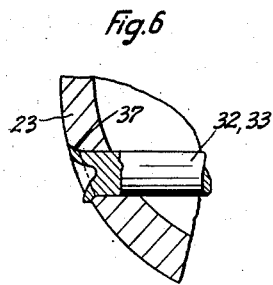
Fig. 6 is a partial sectional view on an enlarged scale of the member shown in Fig. 5 illustrating the mode of attachment of a pin extending through the internal pre-combustion chamber.

In Fig. 6 I have shown how the sections 32 and 33 of the pin provided with the enlarged body 29 or 529 may be fastened in position. The bore of the member 23 is provided with a flaring mouth as indicated at 37 and the end of pin section 32 or 33, respectively, is enlarged by riveting or peening so as to conform to the flaring mouth as shown. Preferably, both pin sections 32 and 33 are attached in this manner.

In the embodiment shown in Figs. 7 and 8, the spherical body 729 is carried by the incandescent wire 38 projecting from the starting plug 28 through a large opening 39 in the wall of the pre-combustion chamber 24, the body 729 to be heated by the wire 38 preparatory to the starting operation and, for that purpose, may be provided with a peripheral groove engaged by a loop of wire 38 as shown in Fig. 8. Here again the spherical body 729 is co-axially located within the member 23 slightly beneath the center thereof and is so dimensioned as to be spaced from the inner walls of the pre-combustion chamber 24.

The wire 38 may either form a clip clamped on the body 729 as shown in Figs. 7 and 8 or, alternatively, may be welded thereto. Such a welded connection is illustrated in Fig. 9, for instance, in which the spherical body 829 is hollow and is welded to two parallel spaced incandescent wires 938 projecting from the starting plug 28. Moreover, in this embodiment the spherical body is co-axially disposed within the pre-combustion chamber 24.

Prior to the starting operation the body 729 or 829 is heated by the starting plug to incandescence whereby the fuel impinging upon the surface of the heated body will immediately vaporize even should the engine be in a more or less cold condition. In this manner a smooth combustion is attained, even during the idling operation. Also, when in normal operation, the incandescent body reduces the knocking sound. The disposition of the spherical body beneath the center of the pre-combustion chamber is preferable because in this position the spherical body will initiate the ignition substantially in the center of the pre-combustion chamber, i. e. at the same point where the initial ignition would take place in the absence of the body. The round shape of the profile indicated at 34, where the channel 26 joins the chamber 24, has been found to enhance the effectiveness of the spherical body counteracting the undesirable sound effects of the combustion.

The body 29, 529, 729 or 829, respectively, may be made of any suitable material, such as metal or a ceramic material.

While I have described a number of preferred embodiments of my invention, I wish it to be clearly understood that the same is in no way restricted to the details shown and described but is capable of numerous modifications within the scope of the appended claims.

What I claim is:

1. In an internal combustion diesel engine, the combination comprising means forming a pre-combustion chamber, a fuel injection mechanism for injecting a relatively compact jet of fuel essentially unmixed with air into said chamber, and only one body of spherical shape with the outer convex surface thereof exposed to the direction of the injected fuel jet and mounted within said pre-combustion chamber spaced from the walls of said pre-combustion chamber in such a position relative to said injection mechanism as to be hit at the convex outer surface thereof by the injected fuel.

2. The combination claimed in claim 1 including a pin extending into said chamber and having a spherical portion between its ends, said portion constituting said body.

3. In an internal combustion diesel engine, the combination comprising means forming a pre-combustion chamber, fuel injection means for injecting fuel essentially unmixed with combustion air into said chamber, a spherically shaped body provided with a convex outer surface directed toward said fuel injection means, means for mounting said spherically shaped body within said pre-combustion chamber to be spaced from the walls of said pre-combustion chamber in such a position relative to said injection mechanism as to be hit at said outer convex surface by the injected fuel, and means for heating said body independently of the heating produced by the combustion during idling operation of said engine while in relatively cold condition.

4. In an internal combustion diesel engine, the combination comprising means forming a pre-combustion chamber, a fuel injection mechanism for injecting fuel essentially unmixed with combustion air into said chamber, a heating device including an electrical resistance heating wire extending into said chamber, and a body of spherical shape with the outer convex surface thereof directed toward said fuel injection mechanism and carried by said wire within said pre-combustion chamber in spaced relationship to the walls of said pre-combustion chamber in such a position relative to said injection mechanism as to be hit at said outer convex surface by the injected fuel jet.

5. The combination claimed in claim 1 in which said body is formed of a ceramic material.

6. The combination claimed in claim 4 in which said body is formed of a ceramic material.

7. The combination claimed in claim 4 in which said body is hollow.

8. The combination claimed in claim 4 in which said body is welded to said wire.

9. The combination claimed is claim 4 in which said wire forms a clip clamped to said body.

10. The combination claimed in claim 1 including a pin extending into said chamber and having a spherical portion between its ends, said portion constituting said body, said ends having an enlarged diameter and being inserted in openings provided in said means forming a pre-combustion chamber.

11. The combination claimed in claim 1 including a pin extending into said chamber and having a spherical portion between its ends, said portion constituting said body, said pin being composed of two sections, one section being screwed into a threaded bore provided in said spherical portion.

12. The combination claimed in claim 1 in which said means form a channel communicating with said pre-combustion chamber substantially in co-axial registry with said fuel injection mechanism, and in which said body is substantially semi-spherical, the flat portion of the semi-sphere facing said channel.

13. The combination claimed in claim 2 in which the ends of said pin are riveted in said member.

14. In an internal combustion diesel engine, the combination comprising means forming a pre-combustion chamber, and a channel communicating therewith, fuel injection means for injecting fuel into said chamber from a point substantially opposite said channel in a direction towards said channel, said injected fuel being substantially devoid of any combustion air, an essentially spherically shaped body having the outer convex surface thereof directed toward said fuel injection means, means for mounting said spherically shaped body within said pre-combustion chamber spaced from the walls of said pre-combustion chamber in a position between the center of said chamber and said channel and in such a manner as to be hit at said outer convex surface by the injected fuel, and means for heating said body independently of the heating produced by the combustion during idling operation of said engine while in cold condition.

References Cited in the file of this patent

UNITED STATES PATENTS

| | | |
|---|---|---|
| 1,813,781 | Thomas et al. | July 8, 1931 |
| 1,912,057 | Bagnulo | May 30, 1933 |
| 1,981,874 | Mock | Nov. 27, 1934 |
| 2,126,442 | Baud | Aug. 9, 1938 |
| 2,436,090 | Bodine | Feb. 17, 1948 |
| 2,619,078 | Witzky et al. | Nov. 25, 1952 |

FOREIGN PATENTS

| | | |
|---|---|---|
| 384,496 | Great Britain | Dec. 8, 1932 |
| 934,579 | France | Jan. 19, 1948 |